(12) United States Patent
Ma et al.

(10) Patent No.: US 8,568,924 B2
(45) Date of Patent: Oct. 29, 2013

(54) MODIFIED BATTERY ANODE WITH CARBON NANOTUBES

(75) Inventors: Jun Ma, Irvine, CA (US); Zhaojie Wei, Beijing (CN); Guanghui Feng, Beijing (CN); Bin He, Beijing (CN); Gang Xu, Beijing (CN); Tao Zheng, Acton, MA (US)

(73) Assignee: CNano Technology Limited, San Francisco, CA (US)

( * ) Notice: Subject to any disclaimer, the term of this patent is extended or adjusted under 35 U.S.C. 154(b) by 110 days.

(21) Appl. No.: 13/307,372

(22) Filed: Nov. 30, 2011

(65) Prior Publication Data
US 2013/0136994 A1  May 30, 2013

(51) Int. Cl.
*H01M 4/133* (2010.01)

(52) U.S. Cl.
USPC .............. 429/231.8; 429/231.4; 429/231.95; 429/233; 429/445; 429/448; 252/502; 252/510; 977/730; 977/742; 977/948; 29/623.1; 29/623.5

(58) Field of Classification Search
USPC ............. 429/217, 231.4, 231.8, 231.95, 233, 429/448, 445; 252/502, 510, 113, 122; 977/730, 742, 948; 29/623.1, 623.5
See application file for complete search history.

(56) References Cited

U.S. PATENT DOCUMENTS

| 6,440,610 | B1 | 8/2002 | Sheem | |
| 6,953,640 | B2* | 10/2005 | Ishii et al. | 429/231.8 |
| 2002/0180360 | A1 | 12/2002 | Zollars | |
| 2004/0095082 | A1 | 5/2004 | Zollars | |
| 2005/0062195 | A1 | 3/2005 | Chao | |
| 2007/0031299 | A1 | 2/2007 | Jiang | |
| 2009/0051267 | A1 | 2/2009 | Kato | |
| 2009/0269511 | A1* | 10/2009 | Zhamu et al. | 427/558 |
| 2011/0171371 | A1* | 7/2011 | Li et al. | 427/122 |

FOREIGN PATENT DOCUMENTS

| JP | 2005-019399 | 1/2005 |
| KR | 10-2008-0022494 | 3/2008 |
| KR | 10-0835883 | 6/2008 |
| KR | 10-2008-0111809 | 12/2008 |

* cited by examiner

*Primary Examiner* — Mark F Huff
*Assistant Examiner* — Omar Kekia
(74) *Attorney, Agent, or Firm* — SV Patent Service

(57) ABSTRACT

An improved anode material for a lithium ion battery is disclosed. The improved anode material can improve both electric conductivity and the mechanical resilience of the anode, thus drastically increasing the lifetime of lithium ion batteries.

12 Claims, 6 Drawing Sheets

MODIFIED BATTERY ANODE WITH CARBON NANOTUBES

BACKGROUND OF THE INVENTION

The present disclosure relates to improving anode material properties for lithium ion batteries.

Lithium ion based batteries are popular because of their energy-to-weight ratios, lack of a memory effect, and a slow loss of charge when not in use. Traditionally, lithium ion batteries use lithium complex oxide, such as lithium cobalt oxide, lithium iron phosphate, lithium manganese oxide, etc, as a cathode and carbon or graphite as the anode. One challenge associated with lithium batteries is due to the expansion and contraction of the lithium alloy during a charging/discharging cycle. For instance, some lithium alloy can expand 300% when fully charged. The expansion and contraction during the charge/discharge cycle can crack or delaminate the anode material, which irreversibly causes the anode to lose electrical contact within the anode and with a current collector and render the end of life for the lithium battery.

There is therefore a long felt need to improve the lifetime of lithium batteries.

SUMMARY OF THE INVENTION

An objective of the present invention is to overcome the above described problems and to increase the lifetime of lithium batteries. The present invention discloses a graphite anode material with improved cycle counts for the lifespan of a battery. Carbon nanotubes are carbon bonded to graphite material via graphitization to provide for a modified anode with enhanced properties in a lithium ion battery.

In one general aspect, the present invention relates to a method for preparing a composite material for anode of a lithium ion battery. The method includes dispersing carbon nanotubes in a binder material to form a mixture of carbon nanotubes and the binder material; liquefying the mixture containing carbon nanotubes dispersed in the binder to form a paste; mixing graphite particles with the paste containing the carbon nanotubes to coat surfaces of the graphite particles with the paste; carbonizing the paste mixed with the graphite particles; graphitizing the carbon nanotubes and the graphite particles to form a carbon-carbon composite in which the carbon nanotubes are bonded to the graphite particles; and forming at least a part of an anode in a lithium ion battery using the carbon-carbon composite.

Implementations of the system may include one or more of the following: the step of liquefying can include heat melting the mixture or dissolving the mixture in a solvent. The binder material can include a polymeric binder or a macromolecular material. The polymeric binder can include thermoplastics, thermoset polymer, or petroleum pitch. The carbon nanotubes can be dispersed with the binder material using a twin screw extruder, a three-roll mill, a high shear mixer, a jet mill, or a ball mill. The paste can include the carbon nanotubes at a concentration in a range between 5% and 25%. The step of carbonizing can include raising the temperature of the paste mixed with the graphite particles. The carbon nanotubes can have a concentration of 0.1-10 wt % relative to the graphite particles. A network of carbon nanotubes and graphite particles can be connected by carbon bonding in the carbon-carbon composite as a result of the graphitizing. The step of graphitizing can be conducted in vacuum in a graphitization furnace. The step of graphitizing is conducted at above 2000° C. for longer than one hour. The carbon-carbon composite can have a non-carbon impurity less than 0.1% after the steps of carbonizing and graphitizing.

In another aspect, the present invention relates to a modified anode for lithium ion battery. The modified anode includes graphite particles; and carbon nanotubes comprising ends and walls, wherein the carbon nanotubes are atomically bonded to the surfaces of the graphite particles at the ends or along the walls of the carbon nanotubes.

Implementations of the system may include one or more of the following: the graphite particles can include natural graphite, synthetic graphite, mesocarbon microbeads (MCMB), or a combination thereof. The carbon nanotubes can include multi-walled carbon nanotubes, single-walled carbon nanotubes, carbon nanofibers, vapor-grown carbon fibers, and/or combination thereof. The carbon nanotubes can have diameters ranging from 0.8 nm to 300 nm. The carbon nanotubes can have diameters ranging from 3 nm to 70 nm. A composite of the graphite particles and the carbon nanotubes can have a non-carbon impurity less than 0.1%. The composite of the graphite particles and the carbon nanotubes can have a non-carbon impurity less than 100 ppm. The anode can have less than 5% loss of capacity after 500 charging and discharging cycles.

In yet another aspect, the present invention relates to a lithium ion battery that includes a separator configured to pass lithium ions in an electrolyte; a cathode; and an anode comprising a carbon-carbon composite that comprises carbon nanotubes and graphite particles that are bonded by carbon-carbon bonds by graphitization, wherein the carbon nanotubes and the graphite particles are connected by carbon-carbon bonds to form a network.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION OF THE INVENTION

Figure 1:
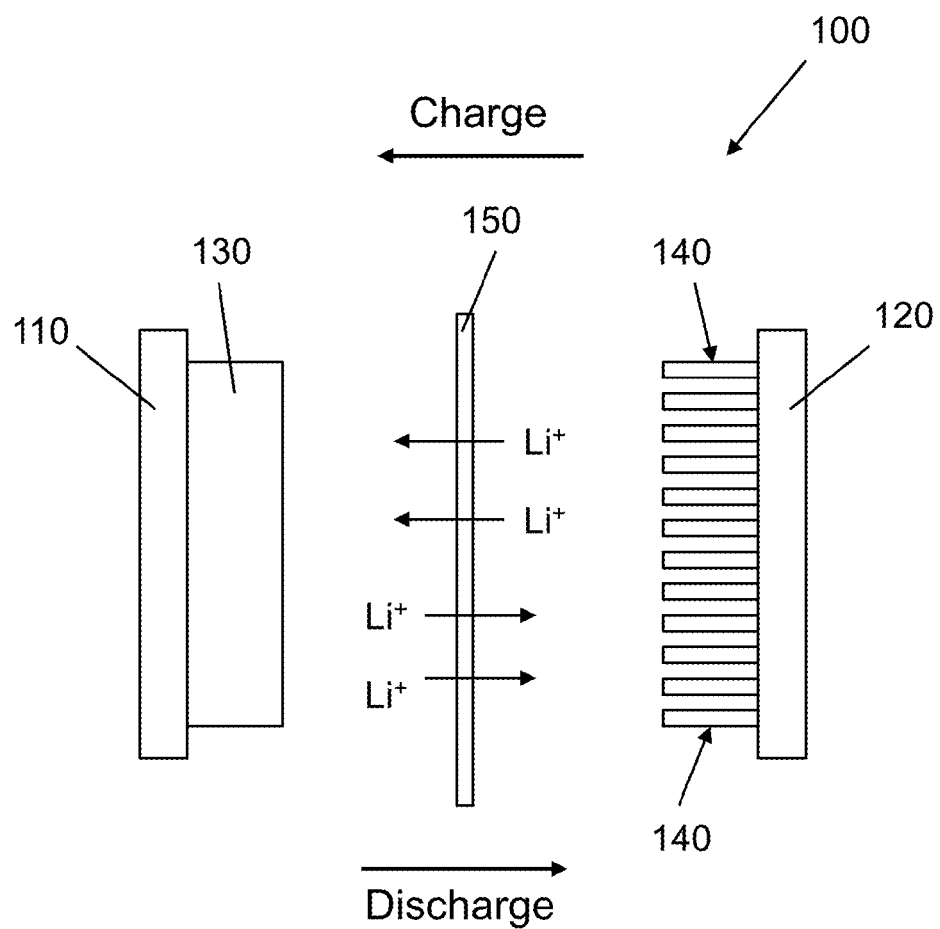
FIG. 1 is a block diagram of a lithium battery in accordance with the present invention.

Referring to FIG. 1, a lithium ion battery 100 in accordance with the present invention includes current collectors 110, 120, an anode 130, a cathode 140, and a separator 150 comprising a lithium ion diaphragm. The interior of the lithium ion battery 100 is filled with an electrolyte. The separator 150 can block electrolyte and allow lithium ions to pass through. During discharge, lithium ions Li+ move from the anode 130 to the cathode 140 through the electrolyte and the separator 150. During charging, an external electrical power source (e.g. the charging circuit) is applied to the current collectors at the same polarity and at a higher voltage than the voltage produced by the battery, forcing the current and the lithium ions to move in the reverse direction.

The cathode 140 can be formed generally by one of three materials: a layered oxide (such as lithium cobalt oxide), a polyanion (such as lithium iron phosphate), or a spinel (such as lithium manganese oxide). As discussed in more detail below, the anode 130 includes an improved anode material which comprises carbon nanotubes bonded to a graphite material via graphitization. The improved anode material can increase electric conductivity as well as improve mechanical strength to the anode 130, which can overcome the delamination and cracking problem in the conventional anode and increase lifespans of the lithium ion batteries.

In accordance with the present invention, the improved anode material involves the use of two main material components: a carbonizable and graphitzable binder and carbon nanotubes:

Carbon Nanotubes

Carbon nanotubes (CNTs) are a new class of graphitic materials with graphene layers in the form of concentric cylinders placed along a fiber axis. CNTs include single-walled and multi-walled carbon nanotubes, carbon nanofibers, vapor-grown carbon fibers, and/or combination thereof. The carbon nanotubes are characterized by ends and walls along the tubes. The diameters of the carbon nanotubes can range from 0.8 nm to 100 nm. Preferably, to ensure strengths of the interconnected network, as described below, the diameters of the carbon nanotubes in accordance with the present invention are in the range of 3 nm-70 nm, and more preferably in the range of 8 nm-30 nm. Carbon nanotubes have many unique properties such as superior electrical and thermal conductivity, and excellent mechanical strength. As made, carbon nanotubes are mostly in agglomerated state as fibers of nanotubes entangled together. These agglomerates have to be dispersed into more individualized carbon nanotubes before the special properties of nanotubes can be reflected. Once dispersed, carbon nanotubes have been used in batteries and other composite system to boost electrical conductivity. Carbon nanotubes can form a continuous network inside a composite at much lowered percolation threshold as compared to traditional conductive filler such as carbon black, vapor-grown carbon fibers (VGCF), graphite or carbon fibers.

Binder

A binder material can be a polymer, or a macromolecular material, etc. They are mostly in solid form but can form viscous liquid upon heating or dissolved in a solvent. In such viscous liquid, carbon nanotubes can be dispersed into individualized fibers from their original agglomerated state.

The polymeric binder suitable for the present invention can be thermoset or thermoplastic resins, or a mixture thereof. In some embodiments, the polymer binder can be pyrolyzable. Examples of thermoplastic resins include, but are not limited to, polyethylene (PE), polypropylene (PP), polystyrene (PP), polyamide (PA), polyurethane (PU), polyvinyl chloride (PVC), polyacrylonitrile (PAN), or thermoplastic polyester resin, for example, thermoset polyester resin or epoxy resin.

In addition to polymeric material, a petroleum pitch can also be used as binder material for nanotube dispersion and form composite with graphite. A pitch is a complex mixture of aromatic hydrocarbons, typically made from made from petroleum products. A pitch can exist in two phases: isotropic pitch and mesophase pitch, and sometimes a mixture of the two phases.

A pitch is often referred as asphalt or tar, where asphalt is more solid while tar is more liquid. In this disclosure, pitch, asphalt, and tar are used interchangeably.

Isotropic pitch has considerable potential as an inexpensive material for the economical production of high performance carbon fiber. Both coal tar and petroleum pitches contain high molecular weight carbonaceous materials and are residues from coal tar and crude oil distillation, respectively. Petroleum pitch is preferable to coal tar pitch as a starting material as it has a lower proportion of undesirable lighter components. Both pitches have a wide weight distribution with average molecular weights ranging between 180 and 600. These complex molecules are basically classified into four groups: saturates, naphthene aromatics, polar aromatics, and asphaltenes. Saturates are low molecular weight aliphatic compounds. Naphthene aromatics are made up of low molecular weight aromatics. Polar aromatics contain higher molecular weights and more heterocyclic rings. The asphaltene fraction has the highest average molecular weight.

A mesophase is a state of matter intermediate between liquid and solid. Liquid crystal is an example of a mesophase. Mesophase pitch is a precursor for producing carbon fiber by carbonization and graphitization. Carbonaceous mesophase particles can be formed from the aromatics of high molecular mass in mesogenic pitch. Carbonaceous mesophase particles can exist in an anisotropic liquid-crystalline phase, often in a matrix of an isotropic pitch. The carbonaceous mesophase is insoluble in quinoline and pyridine.

Dispersion

As made, carbon nanotubes are usually in the form of agglomerates due to their nano-scale geometry and their growth pattern in a given process. A post treatment, as referred to dispersion, is a necessary step to introduce these special materials into other host matrixes in order to form a composite. There are a number of ways to disperse carbon nanotubes as described in the art, including but not limited to cutting, tearing, expanding, exfoliating under shear force. A shear force is one technique to aid with dispersion. Means to apply a shear force include, but are not limited to, milling, sonication, grinding, cavitation, agitation, exfoliation, or others known in the art. As a result of dispersion, the size of nanotubes agglomerates reduce and individualized nanotubes can be found stabilized inside a host matrix.

Carbonization

Carbonization is a process that removes oxygen, nitrogen and hydrogen species from a hydrocarbon or polymer under elevated temperatures, e.g. ~1000° C. This treatment converts polymeric binder or macromolecular hydrocarbon like pith to form material which is predominantly made up of hexagonal networks of carbon.

Graphitization

Graphitization refers further heat treatment to temperatures of up to 3000° C. after carbonization. The stage of carbonization and graphitization are similar for almost all organics. The major differences are the degree of orientation and crystallinity that can be achieved at a given temperature. After graphitization, a hydrocarbon can convert into a graphitic material.

Anode for Lithium Ion Battery

The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/ g. In graphitized carbon materials other than pure graphite crystals, there exists a certain amount of graphite crystallites dispersed in or bonded by an amorphous or disordered carbon matrix phase. The amorphous phase typically can store lithium to a specific capacity level higher than 372 mAh/g, up to 700 mAh/g in some cases, although a specific capacity higher than 1,000 mAh/g has been sporadically reported. Hence, the magnitude of x in a carbonaceous material $Li_xC_6$ varies with the proportion of graphite crystallites and can be manipulated by using different processing conditions. An amorphous carbon phase alone tends to exhibit a low electrical conductivity (high charge transfer resistance) and, hence, a high polarization or internal power loss. Conventional amorphous carbon-based anode materials also tend to give rise to a high irreversible capacity.

Natural graphite is a mineral found in nature. It consists of graphitic carbon regardless of its crystalline perfection. Some natural graphite, often in the form of large flakes, shows very high crystalline perfection. Occasionally, they occur as single crystals of graphite. Varieties of natural graphite with lower structural perfection are classified as 'microcrystalline natural graphite'. Commercial natural graphite is often contaminated with other minerals, e.g. silicates. Therefore, natural graphite is often purified before being used as battery anode. The purification includes acid wash to remove metal, metal oxide and silicates followed by graphitization treatment to improve crystalline orientation. Pitch is sometimes added as a "repairing" agent, as the graphitized product becomes part of the graphite itself. However, in most cases, this type of repair is proven incomplete as the graphitic "skin" formed on the surface of graphite is not strong enough in order to prevent the crack and delamination during battery charging and discharging.

Figure 2A:
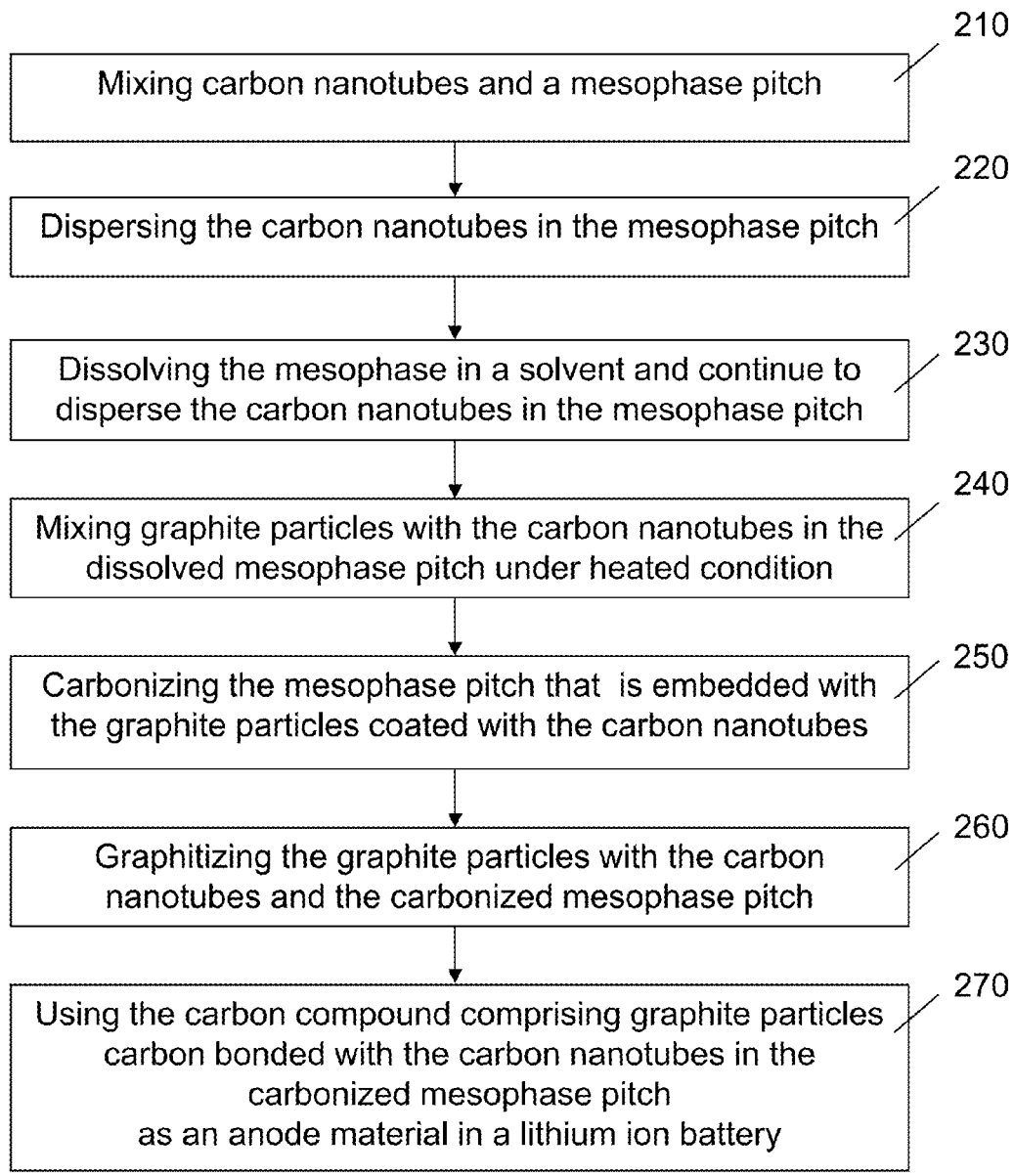
FIG. 2A shows a flowchart for making a composite material suitable for anode in a Lithium battery.
Figure 2B:
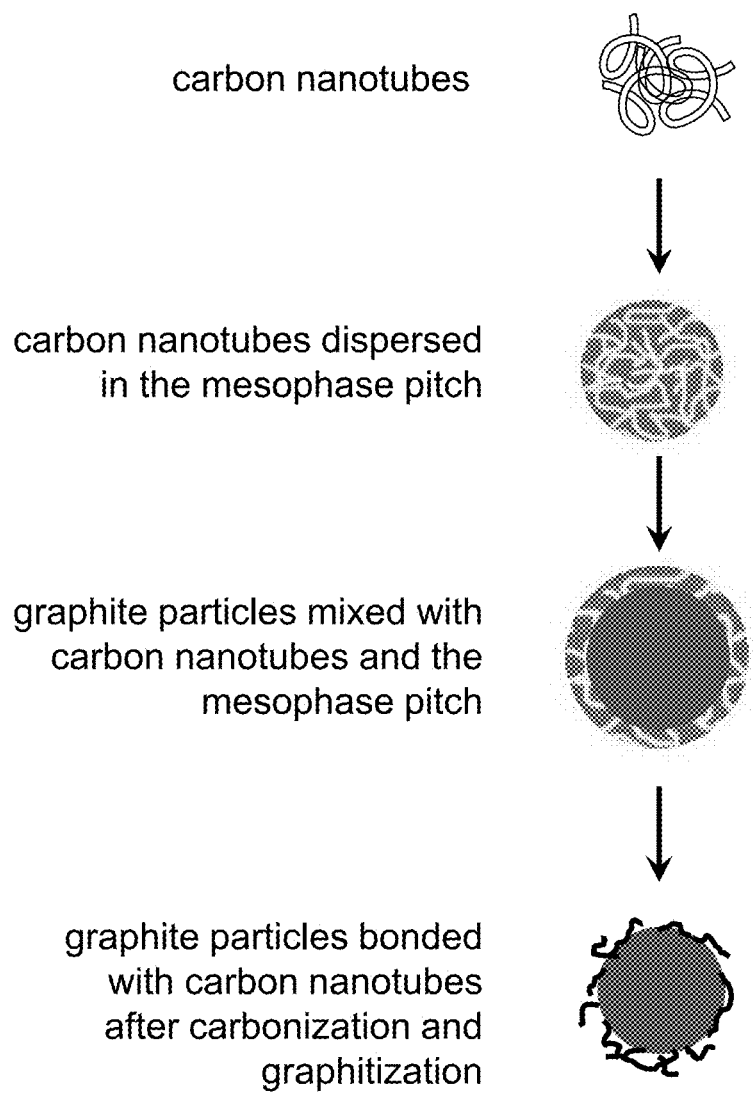
FIG. 2B are schematic drawings of materials in the process of forming the composite material.

Referring to FIGS. 2A and 2B, the improved anode material in the present invention can be produced in the following general process. First, the carbon nanotubes (illustrated in FIG. 2B) and a mesophase pitch are mixed (step 210 in FIG. 2A and illustrated in FIG. 2B). The carbon nanotubes in the present invention are often received in the form of agglomerates, which are required to be dispersed as a pre-treatment. The carbon nanotubes are then dispersed into mesophase pitch under shear force (step 220 in FIG. 2A). In the presently disclosed process, the carbon nanotubes can be dispersed by shear mixing in which carbon nanotubes agglomerates are broken apart and dispersed. The carbon nanotubes can also be dispersed in the mesophase using apparatus such as a twin screw extruder, a three-roll mill, a high shear mixer, or a jet mill.

In one example, the mesophase pitch is fed into a three-roll mill and melted at 250° C. The melted pitch is circulated in the roll mill for a few minutes. When all solid materials have disappeared, a thin film of pitch is formed on the surface of three roll mill. Carbon nanotubes are then added to the mill with 15% of weight equivalent to pitch that is added previously. After milling for a few minutes, the final product was taken off. Additional milling may be necessary if the mixture is deemed to be non-uniform.

In another example, the mixture of solid mesophase pitch and carbon nanotubes is fed into a twin screw extruder. The temperature within the chamber of the twin screw extruder is kept from 250 to 300° C.

In the present invention, the mesophase pitch is a complex carbonaceous material, either in a viscous liquid or a solid phase, which has a distribution melting or softening temperatures. The disclosed method differs from those known in the art has been developed to disperse such material embedded carbon nanotubes. To further assist mixing, the mesophase pitch and the dry carbon nanotubes are dissolved in a solvent such as xylene, and kerosene to form a liquid vehicle while carbon nanotubes is dispersed in the mesophase pitch by an apparatus (step 230 in FIG. 2A). In one example, the mixture of the solvent, the mesophase pitch, and the carbon nanotubes can be poured into a ball mill for dispersing.

Figure 3:
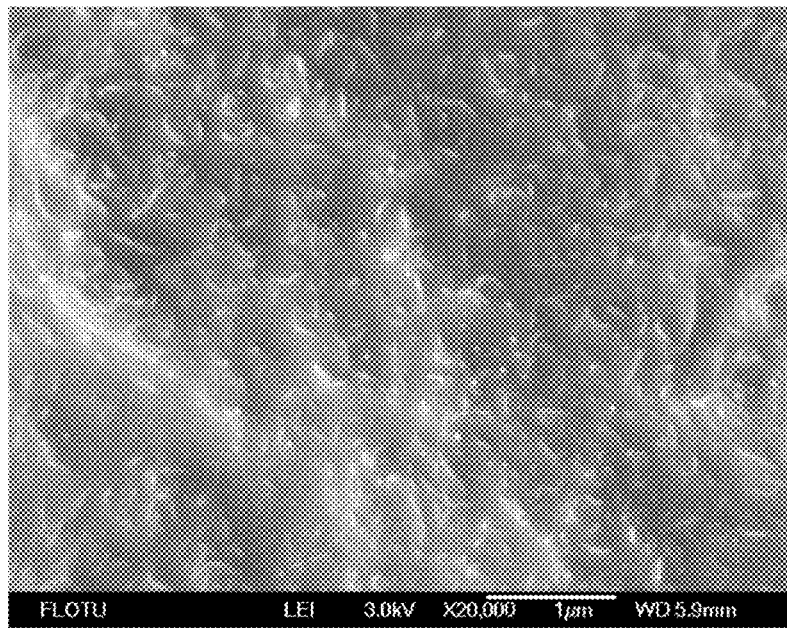
FIG. 3 is an electron micrograph at 20,000× showing the dispersion of carbon nanotubes at 15 wt % in pitch.
Figure 4:
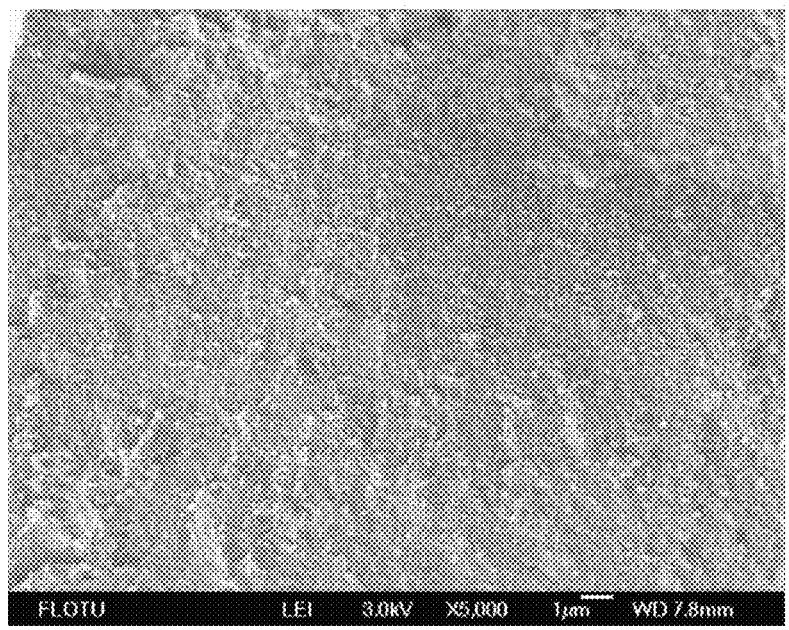
FIG. 4 is an electron micrograph at 5,000× showing the dispersion of carbon nanotubes at 15 wt % in pitch.
Figure 5:
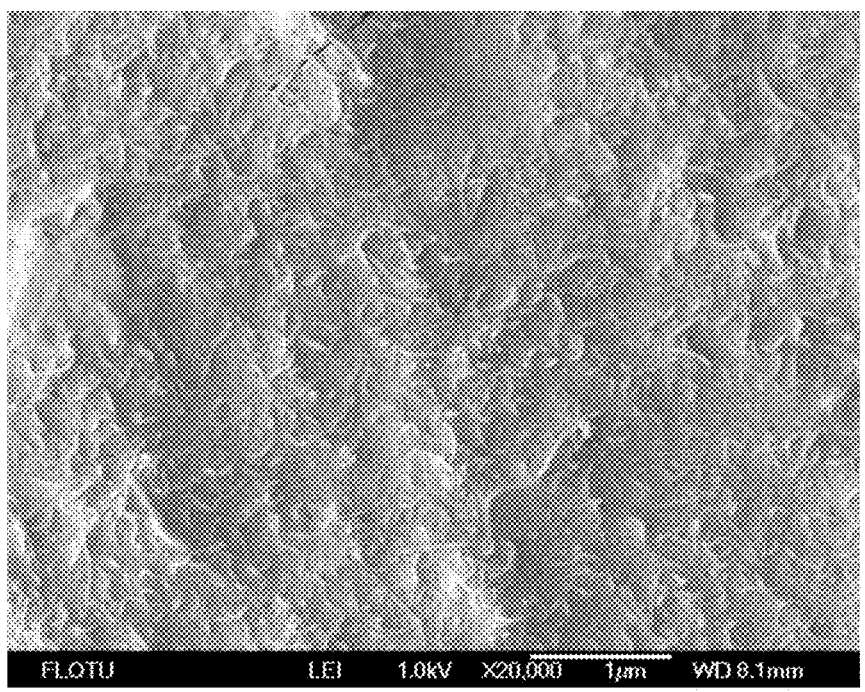
FIG. 5 is an electron micrograph at 20,000× showing the dispersion of carbon nanotubes at 10 wt % in pitch.
Figure 6:
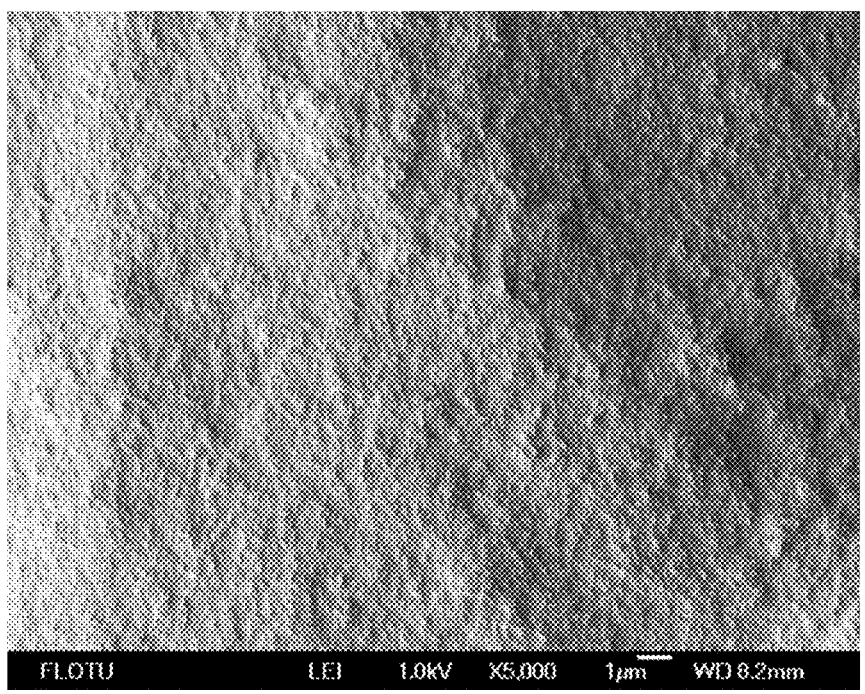
FIG. 6 is an electron micrograph at 5,000× showing the dispersion of carbon nanotubes at 10 wt % in pitch.

FIGS. 3-6 are electron micrographs at different magnifications, showing composites of carbon nanotubes and mesophase pitch after xylene has been removed via evaporation. The paste comprises the carbon nanotubes at a concentration in a range between 5% and 25%. For example, FIGS. 3 and 4 show the composites having carbon nanotubes at 15 wt %. FIGS. 5 and 6 show the composites having carbon nanotubes at 10 wt %. Carbon nanotubes were found to be uniformly dispersed state in the composites; agglomerates is observable in the electron micrographs.

The mesophase pitch embedded with the carbon nanotubes are mixed with natural graphite particles under heated condition, e.g. in a temperature range of 150-200° C. (step 240 in FIG. 2A and illustrated in FIG. 2B). The carbon nanotubes can have a concentration of 0.1-10 wt %, preferably 0.1-5 wt % and more preferably 0.1%-2 wt % relative to the graphite particles. The graphite particles can be made of materials such as natural graphite, synthetic graphite, mesocarbon microbeads (MCMB), or a combination thereof. In another embodiment, the graphite particles can also be coated with the carbon nanotubes in the mesophase pitch dissolved with a solvent. The mesophase pitch that embeds the graphite particles coated with the carbon nanotubes then undergo carbonization treatment, which, as described above, involves removal of oxygen, nitrogen and hydrogen species under elevated temperatures, e.g. ~1000° C. (step 250 in FIG. 2A).

Next, the carbon nanotubes and the carbonized mesophase pitch coated on the graphite particles further undergo graphitization treatment to form a carbon-carbon composite (step 260 in FIG. 2A and illustrated in FIG. 2B). The graphitization treatment, as described in an example below, can be conducted in vacuum at an elevated temperature (e.g. above 2000° C., such as 2600° C.-2800° C.) in a graphitization furnace (for longer than one hour). As a result, the graphite particles in the carbon-carbon composite are atomically bonded in carbon-carbon bonds with the carbon nanotubes and the carbonized mesophase pitch. The carbon-carbon bonds can be formed between the surfaces of the graphite particles and the ends or the side walls of the carbon nanotubes.

Figure 7:
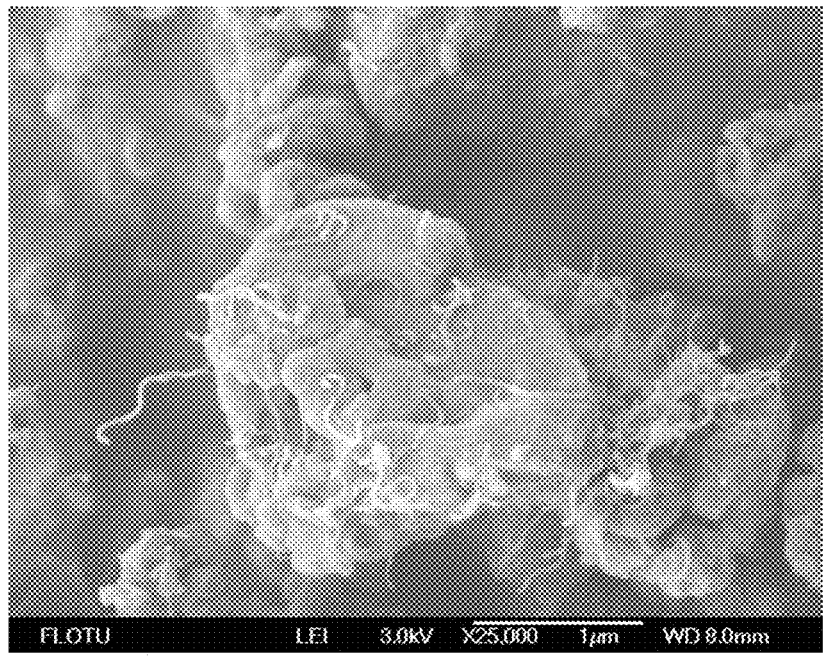
FIG. 7 is an electron micrograph at 25,000× showing graphite particles wrapped by carbon nanotubes and graphitized pitch.
Figure 8:
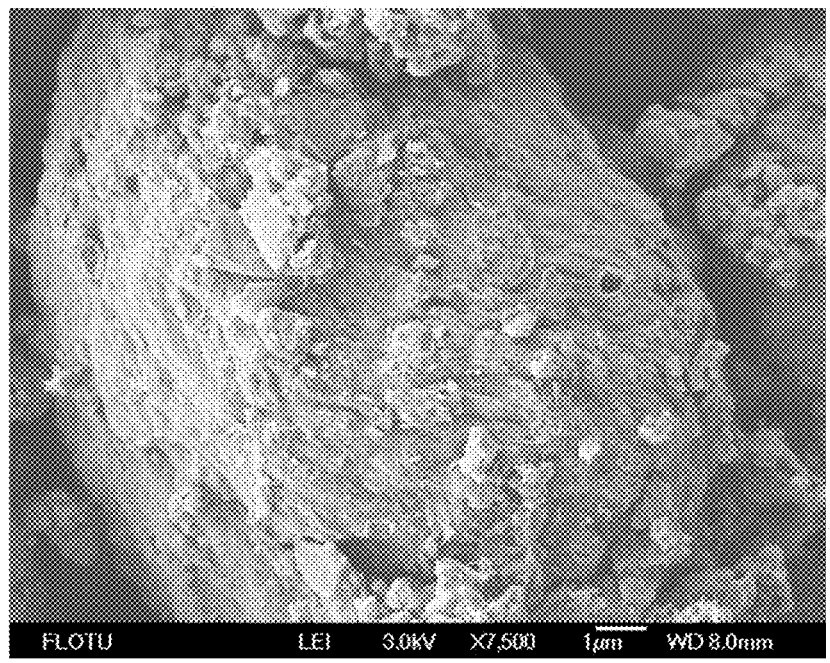
FIG. 8 is an electron micrograph at 7,500× showing graphite particles wrapped by carbon nanotubes and graphitized pitch.

The resultant carbon-carbon composite has a non-carbon impurity less than 1%, preferably less than 0.1%, and more preferably less than 0.01% (i.e. 100 ppm). The composite material having graphite particles wrapped by carbon nanotubes and the mesophase pitch are shown in scanning electron micrographs at different magnifications in FIGS. 7-8. Carbon nanotubes are seen both wrapping the graphite particles and sticking out of the surfaces of the graphite particles. The wrapping action provides enough mechanical protection for the graphite particle as the cracking or delamination caused by expansion is diminished. The graphitized carbon nanotubes and the graphite particles are carbon bonded to form a network make the carbon-carbon composite strong and resilient. The outreaching nanotubes can further serve as bridge to other graphite particles and improve electrical circuit.

The carbon-carbon composite comprising graphite particles carbon bonded with the carbon nanotubes in the carbonized mesophase pitch is used as the improved anode material in a lithium ion battery in accordance with the present invention (step 270 in FIG. 2A). Because the carbon nanotubes are covalently bonded with the graphite particles via carbon-carbon bonds, the improved anode material is significantly stronger than the anode materials used in conventional lithium ion batteries. As a result, the improved anode material can effectively eliminate or reduce cracking and delamination in the anode material caused by the expansions and the contractions during the charge/discharge cycles in lithium ion batteries, which increases battery life cycles.

It should be noted that some previously reported efforts (e.g. US patent publication 20110171371) use carbon nanotubes in the electrode materials for lithium-ion batteries. Although these previous techniques can boost electric conductivity and lower internal impedance in the electrodes, the carbon nanotubes are only blended or mixed with electrode materials. There is no binding between the carbon nanotubes and the electrode materials; thus they do not solve the cracking or delamination problems in the anode materials. Thus the improved anode material disclosed in the present invention can improve both electric conductivity as well as mechanical strength of the anode in lithium ion batteries.

The present invention can be further illustrated by the following examples:

EXAMPLE 1

Mixing Carbon Nanotubes with Mesophase Pitch Via Solid Pulverization

In this experiment, carbon nanotubes and pitch blocks were first transferred into a jet mill at a ratio of 1/10. The mixture is then milled at a rotating speed above 45 Hz. After the pulverization, carbon nanotubes were seen blended within powdered pitch particles.

EXAMPLE 2

Mixing Carbon Nanotubes with Pitch Via Liquid Process

Although pitch is non-uniform in chemical composition, but it is soluble in a number of solvents including benzene, toluene, xylene, kerosene, etc. In a container, a predetermined amount of pitch was first mixed with xylene. The loading of pitch in xylene is about 20%. Once all the pitch particles dissolve in the solvent. Carbon nanotubes were added to the solution with a CNT/pitch ratio at 1/5 (e.g. 20% of CNTs in the paste). The resultant paste is subsequently transferred to either a ball mill or a triple-roll mill for further dispersion.

EXAMPLE 3

Mixing Carbon Nanotubes with Epoxy Resin Via a Twin-Screw Extruder

Twin-screw extruder is a versatile compounding machine in plastics industries. Dispersion of carbon nanotubes in plastics and epoxy have been demonstrated elsewhere. Typically, CNT and epoxy resin are fed into a twin screw extruder at different feeding spots. The melted epoxy inside a twin screw will then carry the CNT into a dispersing zone, where designed screw elements will create appropriate shear force to break CNT agglomerates and disperse them into melt resin. The molten resin with dispersed CNT was eventually extruded out of the machine and cut into pellets after cooled down to lower temperatures.

EXAMPLE 4

Application of CNT-Embedded Pitch Powder onto Graphite

Powder formed CNT-pitch paste is first mixed with natural graphite with diameter of 20 micrometers in a dry blender slowly heated to 200° C. The ratio of CNT to graphite is controlled at 1/1000. The pitch will start to melt under this temperature and melted pitch carrying CNT will then form a thin coating outside the graphite particles. The mixtures is then allowed to cool down and moved to a graphitization furnace. Under vacuum, the furnace temperature is raised to above 2000° C., such as 2600° C.-2800° C., for a period of longer than one hour such as 12 hours. The materials is finally cooled down and removed from the furnace.

EXAMPLE 5

Application of CNT-Embedded Paste onto Graphite

Similar to the procedure described in Example 4, the CNT-embedded paste was mixed with natural graphite. After mixing, the solvent was evaporated from the paste via heating. The resultant solid product was finally sent to graphitization.

EXAMPLE 6

Evaluation of CNT-Modified Graphite Using SEM

Scanning electron microscope was used to check state of dispersion of CNT in the graphite. As shown in FIGS. 3-6, scanning electron micrographs show that carbon nanotubes were no longer in the agglomerated form. Instead, they are forming network around graphite particles.

EXAMPLE 7

Evaluating CNT-Modified Graphite as an Anode Material for a Lithium Ion Battery

A coin cell lithium ion battery is assembled by using Li metal as cathode, and the above described improved anode material in an anode. Under high charging rates, e.g. 5 C, 10 C and 20 C of the battery capacity charging/discharging rates, it was observed that the cycle life of the coin cell battery was steady with less than 5% loss of capacity after 500 cycles.

Advantages

Carbon nanotubes are known as the strongest materials made in recent history. The excellent tensile strength as well as other properties such as resiliency makes it a superior candidate for reinforce other material or form composite. In the present invention, the carbon nanotubes are first dispersed and coated the graphite particles. A subsequent graphitization removes and graphitizes carbon additives (pitch, epoxy, etc), which allow these additives to act as a "solid glue" to bind CNTs onto the surfaces of the graphite particles. Unlike previously disclosed procedures, the CNTs are bonded to the graphite via C—C bonds rather than loosely attached by dispersive molecular interactions. The CNTs and the graphite particles form a strong network. Such strong bonds can transfer the superior mechanical strengths of the carbon nanotubes to the underline graphite particles, which provide reinforcement to the overall composite material. The strong network of carbon nanotubes can restrain the expansions of the graphite material during charging and discharging cycles and prevent structural cracking, and therefore enhancing the lifetime of the anode.

While the invention has been described by way of examples and in terms of the specific embodiments, it is to be understood that the invention is not limited to the disclosed embodiments. To the contrary, it is intended to cover various modifications and similar arrangements as would be apparent to those skilled in the art. For example, the mesophase pitch and the carbon nanotubes can be dissolved with different solvents and mixed or dispersed with different apparatus from the examples used above.

Therefore, the scope of the appended claims should be accorded the broadest interpretation to encompass all such modifications and similar arrangements. All publications, patents, and patent applications cited herein are hereby incorporated by reference in their entirety and for all purposes.

What is claimed is:

1. A method for preparing a composite material for anode of a lithium ion battery, comprising:
   dispersing carbon nanotubes in a binder material to form a mixture of carbon nanotubes and the binder material;
   liquefying the mixture containing carbon nanotubes dispersed in the binder to form a paste;
   mixing graphite particles with the paste containing the carbon nanotubes;
   coating surfaces of the graphite particles with the paste containing the carbon nanotubes;
   carbonizing the paste mixed with the graphite particles;
   after the step of carbonizing, graphitizing the carbon nanotubes and the graphite particles;
   bonding the carbon nanotubes to the graphite particles to form a carbon-carbon composite; and
   forming at least a part of an anode in a lithium ion battery using the carbon-carbon composite.

2. The method of claim 1, wherein the step of graphitizing is conducted in vacuum in a graphitization furnace.

3. The method of claim 2, wherein the step of graphitizing is conducted at above 2000° C. for longer than one hour.

4. The method of claim 1, wherein a network of carbon nanotubes and graphite particles are connected by carbon bonding in the carbon-carbon composite as a result of the graphitizing.

5. The method of claim 1, wherein the step of liquefying comprises heat melting the mixture or dissolving the mixture in a solvent.

6. The method of claim 1, wherein the binder material comprises a polymeric binder or a macromolecular material.

7. The method of claim 6, wherein the polymeric binder comprises thermoplastics, thermoset polymer, or petroleum pitch.

8. The method of claim , wherein the carbon nanotubes are dispersed with the binder material using a twin screw extruder, a three-roll mill, a high shear mixer, a jet mill, or a ball mill.

9. The method of claim 1, wherein the paste comprises the carbon nanotubes at a concentration in a range between 5% and 25%.

10. The method of claim 1, wherein the carbon nanotubes have a concentration of 0.1-10 wt % relative to the graphite particles.

11. The method of claim 1, wherein the step of carbonizing comprises:
    raising the temperature of the paste mixed with the graphite particles.

12. The method of claim 1, wherein the carbon-carbon composite has a non-carbon impurity less than 0.1% after the steps of carbonizing and graphitizing.

* * * * *